(12) United States Patent
Yamamoto et al.

(10) Patent No.: US 9,481,802 B2
(45) Date of Patent: *Nov. 1, 2016

(54) COATING COMPOSITION, COATING METHOD, AIR CONDITIONER, VENTILATION FAN, AND ELECTRICAL EQUIPMENT

(75) Inventors: Yoshinori Yamamoto, Tokyo (JP); Yasuhiro Yoshida, Tokyo (JP); Teruhiko Kumada, Tokyo (JP); Reiji Morioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1103 days.

This patent is subject to a terminal disclaimer.

(21) Appl. No.: 13/254,511

(22) PCT Filed: Mar. 10, 2010

(86) PCT No.: PCT/JP2010/001692
§ 371 (c)(1),
(2), (4) Date: Sep. 2, 2011

(87) PCT Pub. No.: WO2010/106762
PCT Pub. Date: Sep. 23, 2010

(65) Prior Publication Data
US 2011/0315360 A1    Dec. 29, 2011

(30) Foreign Application Priority Data
Mar. 19, 2009 (JP) .................... PCT/JP2009/001245

(51) Int. Cl.
*C09D 5/16* (2006.01)
*C09D 127/18* (2006.01)
(Continued)

(52) U.S. Cl.
CPC .......... *C09D 7/1216* (2013.01); *C08K 3/0025* (2013.01); *C09D 5/024* (2013.01);
(Continued)

(58) Field of Classification Search
None
See application file for complete search history.

(56) References Cited

U.S. PATENT DOCUMENTS 4,051,302 A * 9/1977 Mayama et al. ............. 428/345
5,968,642 A * 10/1999 Saito ...................... B05D 5/083
427/180

(Continued)

FOREIGN PATENT DOCUMENTS

JP    10 132483    5/1998
JP    11 92689     4/1999

(Continued)

OTHER PUBLICATIONS

U.S. Appl. No. 13/201,316, filed Aug. 12, 2011, Yoshida, et al.
(Continued)

*Primary Examiner* — Monique Jackson
(74) *Attorney, Agent, or Firm* — Oblon, McClelland, Maier & Neustadt, L.L.P.

(57) ABSTRACT

A coating composition having high dirt prevention properties and improved adhesiveness to hydrophobic surfaces such as those made of a plastic, and a coating method are provided. More specifically, provided is a coating composition, including: hydrophobic resin particles dispersed in an aqueous medium; hydrophilic inorganic fine particles; and an oxidizing agent containing at least one of a peroxide, a perchloric acid, a chlorate, a persulfuric acid, a superphosphoric acid, and a periodate, and also provided is a coating method including the steps of: preparing a first agent having hydrophilic inorganic fine particles and hydrophobic resin particles dispersed in an aqueous medium; preparing a second agent by adding, to the first agent, an oxidizing agent containing at least one of a peroxide, a perchloric acid, a chlorate, a persulfuric acid, a superphosphoric acid, and a periodate; applying the second agent onto a member to be coated; and drying the second agent on the member to be coated.

10 Claims, 3 Drawing Sheets

(51) Int. Cl.
  *B05D 3/02* (2006.01)
  *B05D 7/24* (2006.01)
  *F28F 13/18* (2006.01)
  *C09D 7/12* (2006.01)
  *C08K 3/00* (2006.01)
  *C09D 5/02* (2006.01)
  *C08K 3/22* (2006.01)
  *C08K 3/28* (2006.01)

(52) U.S. Cl.
  CPC ......... *C09D 5/1618* (2013.01); *C09D 5/1637* (2013.01); *C09D 7/1266* (2013.01); *C09D 127/18* (2013.01); *C08K 3/22* (2013.01); *C08K 3/28* (2013.01); *Y10T 428/254* (2015.01)

(56) References Cited

U.S. PATENT DOCUMENTS

| | | | |
|---|---|---|---|
| 6,337,129 B1 | 1/2002 | Watanabe et al. | |
| 6,350,806 B1* | 2/2002 | Tsuda | C08K 3/36 524/269 |
| 7,115,303 B2* | 10/2006 | Ozawa | C08G 12/32 427/213.34 |
| 8,171,750 B2* | 5/2012 | Morioka et al. | 62/426 |
| 2003/0203991 A1 | 10/2003 | Schottman et al. | |
| 2005/0277543 A1* | 12/2005 | Takahashi et al. | 502/100 |
| 2010/0096114 A1 | 4/2010 | Yoshida et al. | |
| 2010/0288963 A1 | 11/2010 | Mitina et al. | |

FOREIGN PATENT DOCUMENTS

| | | |
|---|---|---|
| JP | 2001 88247 | 4/2001 |
| JP | 2002 336768 | 11/2002 |
| JP | 2003 181299 | 7/2003 |
| JP | 2004 51725 | 2/2004 |
| JP | 2004 323700 | 11/2004 |
| WO | 97 45502 | 12/1997 |
| WO | WO 2005/000914 A1 | 1/2005 |
| WO | WO 2010/105938 A1 | 9/2010 |

OTHER PUBLICATIONS

Extended Search Report issued Jul. 24, 2012 in European Patent Application No. 10753259.0.
International Search Report issued Apr. 6, 2010 in PCT/JP10/01692 filed Mar. 10, 2010.

\* cited by examiner

COATING COMPOSITION, COATING METHOD, AIR CONDITIONER, VENTILATION FAN, AND ELECTRICAL EQUIPMENT

TECHNICAL FIELD

The present invention relates to a coating composition, a coating method, and electrical equipment such an air conditioners and ventilation fans, in particular, to an aqueous coating composition for preventing a surface of a component of a piece of electrical equipment from getting dirty, a method for coating a component, and a coated piece of electrical equipment.

BACKGROUND ART

Because dirt stains such as dust, grime, oil smoke, and tobacco tar adhere to surfaces of various articles used indoors or outdoors, such as home electrical appliances, various methods of preventing the attachment or adherence of this dirt have peen proposed. For example, methods for preventing lipophilic dirt from adhering to the surface of an article and facilitating the removal of lipophilic dirt from the surface of an article, by coating the surface of the article with an antistatic agent or an oil repellent fluororesin are well known. However, the above-mentioned methods face the problem that the coating film coated on the article easily peels, and hence the long-term maintenance of dirt prevention properties cannot be expected.

In order to solve the above-mentioned problem, a method for long term maintenance of dirt prevention properties by forming a coating film in which hydrophilic parts and hydrophobic parts are exposed independently of each other in a very small area have been attempted. For example, a dirt prevention coating composition that is capable of micro-dispersing and exposing an inorganic oxide containing a photocatalytic oxide and a hydrophobic resin have been proposed. (See, for example, Patent Document 1)

Patent Document 1: JP 2001-88247 A

DISCLOSURE OF THE INVENTION

Problems to be Solved by the Invention

However, the above-mentioned conventional coating composition has the problem that, even if resin particles for imparting hydrophobicity are included, satisfactory hydrophobic parts are not always formed on a surface of the coating film, and hence the function necessary for preventing attachment of dirt stains is not sufficiently provided.

Further, the above-mentioned conventional coating composition also has the problem that, when inorganic particles such as titanium oxide and silica are used as the hydrophilic parts, they are incompatible with the hydrophobic surface of plastics and thus weakly attach to the surface, meaning the coating film is not formed or, even if the coating is formed, peeling easily occurs.

The present invention has been made to solve problems such as those described above, and an object of the present invention is to provide a coating composition having high dirt prevention properties while being capable of improved adhesiveness to hydrophobic surfaces, a coating method and coated electrical equipment.

Means for Solving the Problems

The first coating composition according to the present invention is a coating composition having hydrophobic resin particles dispersed in an aqueous medium, the coating composition including: hydrophilic inorganic fine particles; and an oxidizing agent containing at least one of a peroxide, a perchloric acid, a chlorate, a persulfuric acid, a superphosphoric acid, and a periodate.

Further, the first coating method according to the present invention includes the steps of: preparing a first agent having hydrophilic inorganic fine particles and hydrophobic resin particles dispersed in an aqueous medium then preparing a second agent by adding an oxidizing agent containing at least one of a peroxide, perchloric acid, a chlorate, persulfuric acid, superphosphoric acid, and a periodate to the first agent then applying the second agent onto a member to be coated and drying the second agent on the coated member.

Effect of the Invention

According to the present invention, the dirt prevention properties of the coating film can be improved and the adhesiveness to the material to be coated can be improved.

MODES FOR CARRYING OUT THE INVENTION

The inventors of the present invention have made intensive studies to solve the above-mentioned problems. As a result, the inventors found that one of the reasons for the problems is that hydrophilic groups are imparted on the surface of each resin particle in conventional coating compositions, resulting in reduction in their dirt prevention properties. Further, the inventors have found that a similar problem also exists when a surfactant, a stabilizer, and the like are mixed.

Figure 1:
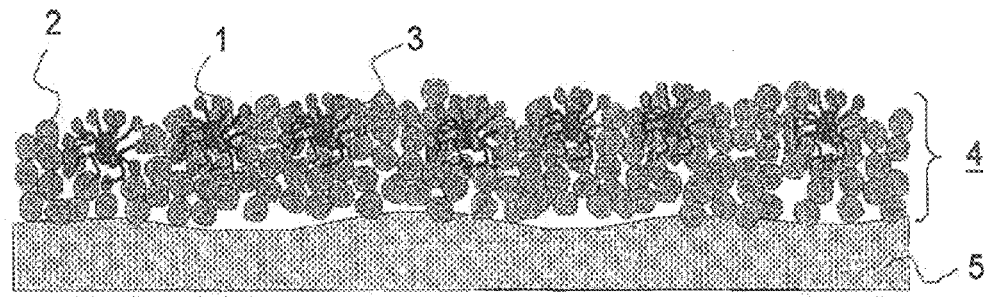
FIG. 1 is an explanatory diagram showing an image of a coating film formed by using a coating composition according to Embodiment 1 of the present invention.

The above-mentioned supposed phenomenon is described with reference to the drawings. FIG. 1 is an explanatory diagram showing an image of a coating composition having hydrophobic particles and hydrophilic particles dispersed in an aqueous medium. As shown in FIG. 1, hydrophobic particles 1 and hydrophilic particles 2 are dispersed in the aqueous medium, to disperse the hydrophobic particles 1 and the hydrophilic particles 2 of the coating composition, hydrophilic groups 3 derived from a dispersant and a surfactant are incorporated in the surrounding (For example, hydrophobic groups from the dispersant surround each hydrophobic particle 1 which are then surrounded by their corresponding hydrophilic groups 3. As a result, the dispersant and the surfactant are present surrounding hydrophobic particles 1.). Thus, coating film 4 is formed in the state that hydrophilicity is provided surrounding each hydrophobic particle 1, hence it becomes difficult for hydrophobic parts for removing dirt stains on the surface of the coating film 4 to be exposed.

Figure 2:
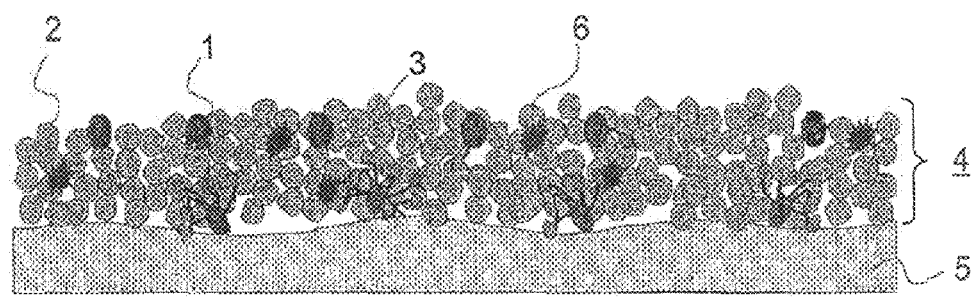
FIG. 2 is an explanatory diagram showing an image of a coating film formed by using a coating composition according to Embodiment 1 of the present invention.

At this stage, as shown in FIG. 2, if a decomposition agent 6 is used to decompose hydrophilic groups 3 around each hydrophobic particle 1, thereby exposing the hydrophobic part, it is possible to expose the hydrophobic parts effectively on the surface of coating film 4. Consequently, the dirt prevention properties of coating film 4 can be improved.

In addition, particularly in the case where a member to be coated 5 is a hydrophobic plastic material, the hydrophobic parts of each hydrophobic particle 1 are arranged so as to contact the member to be coated 5, thereby remarkably improving the adhesiveness of the coating film 4 to the member to be coated 5.

As shown in FIG. 2, the decomposition agent 6 cleaves the hydrophilic groups 3 from the hydrophobic particle 1, thereby yielding hydrophobic particle 1 having no hydrophilic group 3. Because the hydrophobic particle 1 has a different polarity from that of surrounding hydrophilic particles 2, the hydrophobic particle 1 interacts with the hydrophilic particles 2 repulsing them, causing them to precipitate to the surface of the coating film 4. On the other hand, in the case where only some of the hydrophilic groups 3 are cleaved, resulting in a hydrophobic particle 1 still retaining some hydrophilic groups 3, the hydrophobic particle 1 attempts to adhere to surrounding hydrophilic particles 2 having the same polarity and to stabilize itself by attaching to the hydrophobic member to be coated 5 at the hydrophobic particle 1 side.

As a result, hydrophobic parts for removing dirt stains are arranged on the surface of coating film 4, and hydrophobic particles 1 having some hydrophilic groups 3 are arranged at the interface between the coating film 4 and the member to be coated 5. Thus, coating film 4 can have both the function of removing dirt stains and the function of enhancing the adhesiveness to the member to be coated 5.

Described hereinafter are structures in which each of the technical ideas of the present invention is embodied.

Embodiment 1

The coating composition according to Embodiment 1 of the present invention is a coating composition having resin particles as hydrophobic particles 1 dispersed in an aqueous medium, the coating composition including: hydrophilic inorganic fine particles as hydrophilic particles 2; and an oxidizing agent containing at least one of a peroxide, a perchloric acid, a chlorate, a persulfuric acid, a superphosphoric acid, and a periodate to be used as a decomposition agent 6 for decomposing hydrophilic groups 3 surrounding hydrophobic particles 1. Here, the hydrophilic inorganic fine particles 2 preferably have an average particle diameter of 15 nm or less in order to cause the hydrophobic resin particles 1 to protrude from the surface of coating film 4 and to cause coating film 4 to form with a base of minute inorganic fine particles 2.

Further, by dispersing hydrophobic parts formed by resin particles 1 in hydrophilic parts formed by the inorganic fine particles 2, water can be spread easily and dirt stains can be removed.

According to the present invention, an oxidizing agent which has the effect of being able to cleave hydrophilic groups 3 from around each resin particle 1 is used as a decomposition agent 6, hence the bonding of hydrophilic groups attaching to the hydrophobic resin particles 1 attributed to the dispersant and the like can be cleaved, the resin particles 1 can be properly dispersed in the hydrophilic inorganic fine particles 2, and the hydrophobic part of each resin particle 1 can be exposed on the surface of coating film 4. Thus, hydrophilic dirt stains can be physically blocked by the hydrophobic resin particles 1, thus it is possible to remove the dirt stains.

Further, the hydrophilic groups 3 attaching to the hydrophobic resin particles 1 decomposed by the oxidizing agent 6 reinforces the bonding action with the hydrophilic particles 2, and the hydrophobic part of the decomposed hydrophobic resin particles 1 reinforces the bonding action with the surface of the member to be coated 5. Thus, surfaces that resist coating such as a plastic can be coated with the coating composition.

Note that the decomposition reaction caused by the oxidizing agent 6 in the coating composition of the present invention can be effectively initiated by, for example, a method in which the member to be coated 5 is heated after coating with the coating composition or a method in which an oxidation initiator is mixed just before coating with the coating composition. Alternatively, an oxidizing agent 6 separately prepared may be mixed just before coating with the coating composition.

[Oxidizing Agent]

The oxidizing agent 6 according to the present invention is preferably water-soluble and preferably has the effect of being able to decompose an organic substance at normal temperature. It is possible to use, as an inorganic oxidizing agent, an inorganic peroxide represented by a chemical formula of a metal salt of hydrogen peroxide, and a peroxide having a structure in which a hydroxy group (—OH) of an oxoacid is replaced by a hydroperoxide group (—O—OH). Further, perchloric acids, which are kinds of oxoacids of chlorine, or persulfuric acids, which are oxoacids of sulfur may also be used.

It is also possible to use, as an organic oxidizing agent, a peroxide compound having a functional group with a peroxide structure (—O—O—) or a peroxide compound having a functional group with a percarboxylic acid structure (—C(=O)—O—O—).

More specifically, examples of the organic oxidizing agent which may be used include halogen benzoyl peroxide, lauroyl peroxide, acetyl peroxide, dibutyl peroxide, cumene hydroperoxide, butyl hydroperoxide, peroxomonocarbonate, sodium peracetate, potassium peracetate, m-chloroperbenzoic acid, tert-butyl perbenzoate, and percarboxylic acid.

In addition, examples of the inorganic oxidizing agent which may be used include: peroxides such as hydrogen peroxide, sodium peroxide, potassium peroxide, magnesium peroxide, calcium peroxide, and barium peroxide; persulfuric acids such as ammonium persulfate, sodium persulfate, and potassium persulfate; perchlorates such as ammonium perchlorate, sodium perchlorate, and potassium perchlorate; chlorates such as potassium chlorate, sodium chlorate, and ammonium chlorate; superphosphoric acids such as calcium superphosphate and potassium superphosphate; and periodates such as sodium periodate, potassium periodate, and magnesium periodate.

Further, the addition ratio of the oxidizing agent 6 is preferably 0.1 to 25, and more preferably 0.5 to 10 when the mass of the solid content of the resin particle 1 is defined as 100. When the addition ratio of the oxidizing agent 6 is less than 0.1, the effect of decomposing hydrophilic groups 3 attributed to the dispersant, surfactant, and stabilizer, or the like surrounding resin particles 1 is not sufficiently provided. When the addition ratio of the oxidizing agent 6 is more than 25, the amount of the oxidizing agent 6 is too large for a coating film to include the desired resin particles 1 and the desired inorganic fine particles 2, resulting in insufficient dirt prevention properties.

[Resin Particles]

The resin particles 1 according to the present invention need to be dispersed in the coating composition, hence the resin particles 1 are dispersed by using a dispersant such as polyoxyalkylene alkyl ether or polyoxyethylene cetyl ether. The hydrophobic resin particles 1 are preferably fluororesin particles. Examples of the fluororesin which may be used include polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), an ethylene-chlorotrifluoroethylene copolymer (ECTFE), a polyvinylidene fluoride (PVDF), polychlorotrifluoroethylene (PCTFE), polyvinyl fluoride (PVF), copolymers thereof, and mixtures thereof. Other resin particles may also be mixed into the above-mentioned resin particles.

Moreover, the resin particles 1 may also be resin particles of a vinyl acetate resin, an acrylic resin, a phenolic resin, a silicone-modified acrylic resin, a vinylidene chloride resin, a vinyl chloride resin, an epoxy resin, a urethane resin, an acrylic urethane resin, a silicone resin, a polyester resin, a polyolefin resin, or the like. Copolymers or mixtures of thereof may be used. Other resin particles may also be mixed into the above-mentioned particles.

The average particle diameter of the resin particles 1 is measured by, for example, a light scattering method and is preferably about 50 to 500 nm, more preferably 100 to 250 nm. When resin particles 1 having an average particle diameter in the above-mentioned range are used, the resin particles 1 are likely to be dispersed and are a sufficiently large particle compared with the thickness of the coating film 4, and hence the resin particles 1 are easily exposed on the surface of coating film 4. If the average particle diameter is too large, the region which the hydrophobic part accounts for in the coating film 4 becomes too large, with the result that a hydrophobic contaminant is apt to attach to coating film 4, and the unevenness of coating film 4 becomes larger, resulting in easy fixation of a contaminant.

Further, the content of the resin particles 1 is preferably 0.2 mass % to 5.0 mass %, more preferably 0.5 mass % to 3.0 mass %, based on the coating composition being in an aqueous medium. If the content of the resin particles 1 is less than this, sufficient dirt prevention properties are not provided. If the content of the resin particles 1 is too greater than this, the resin particles 1 sometimes aggregate when the oxidizing agent 6 is added in a coating composition and the whole is mixed.

[Inorganic Fine Particles]

It is possible to use, as the inorganic fine particles 2 according to the present invention, hydrophilic silica fine particles or titanium fine particles. Of those, the silica fine particles have a refractive index value similar to that of plastic, glass, or the like, compared with those of other inorganic fine particles of, for example, titania or alumina, and hence, when plastic, glass, or the like is used in a member to be coated 5, the member is less likely to look white or glittery due to light reflection at the interface or its surface. When silica is in fine particle form, the effect can be further enhanced. The average particle diameter of the silica fine particles is, as described above, preferably about 15 nm or less when measurement is performed by, for example, a light scattering method.

Further, when silica fine particles having an average particle diameter of 4 to 15 nm are used, it is possible to form a state in which the surface portion of a single silica fine particle, the surface portion corresponding to 15 to 30 mass % of the mass of the silica fine particle, is half-dissolved in water in the coating composition. If the average particle diameter is more than 15 nm, the content ratio of the silica component dissolved in water becomes smaller, and hence the action as a binder is difficult to provide. Thus, the strength of coating film 4 is not sufficiently ensured, resulting in the easy occurrence of cracks.

If the average particle diameter is less than 4 nm, the content ratio of a silica component half-dissolved in water becomes too high, possibly resulting in the silica particles aggregating.

Further, the average particle diameter of the silica fine particles also affects the outer appearance characteristics of the coating film 4, such as transparency. When silica fine particles having an average particle diameter of 15 nm or less are used, the scattering of light reflected by the coating film 4 becomes less, and hence the transparency of the coating film 4 improves, and the color tone and texture of the member to be coated 5 are prevented from changing. As a result, impairment to the color tone and texture of the member to be coated 5 can be prevented.

Further, when silica fine particles having an average particle diameter of 15 nm or less are used, the resultant coating film 4 includes a dense silica component but with a minute gap between silica fine particles. The thickness of coating film 4 can be made thinner because a dense silica component is included. In addition, the gap contributes to making the intermolecular force (adhesive force) between silica fine particles and particles causing contamination less, and hence the effect of preventing the attachment of particles causing contamination is exhibited.

The addition ratio of silica fine particles is preferably 0.5 mass % to 5 mass %, more preferably 1 mass % to 4 mass % based on the coating composition. If the addition ratio is too small, the inorganic fine particles 2 occur sparsely, thereby being unable to form the base of coating film 4. If the addition ratio is too large, the base of the coating film 4 becomes too thick, leading to easy occurrence of cracks.

When, for example, the content ratio of silica fine particles to fluororesin particles (solid content mass ratio) is controlled to 70:30 to 95:5 in the coating composition, obtained is a coating film 4 in which a hydrophilic region attributable to the silica fine particles and a hydrophobic region attributable to the fluororesin particles exist in a well-balanced mixture if drying at normal temperatures is carried out. The content ratio is controlled to 80:20 more preferably.

On the other hand, particularly when coating film 4 is subjected to heavy dust and grime environments, for example, the content ratio of silica fine particles to fluororesin particles (solid content mass ratio) can be set from between 20:80 to 30:70, as increasing the content of the resin particles 1, thereby improves the dirt prevention properties of the surface of coating film 4.

In addition, the inorganic fine particles 2 may be fine particles of a semiconductor or a metal such as silicon, magnesium, aluminum, titanium, cerium, tin, zinc, germanium, indium, or antimony. Further, the inorganic fine particles 2 may be fine particles of an oxide or a nitride of a metal such as magnesium, aluminum, titanium, cerium, tin, zinc, germanium, indium, or antimony. Alternatively, the inorganic fine particles 2 may also be selected as a mixture of the above.

[Aqueous Medium]

It is possible to use, as the aqueous medium according to the present invention, water such as deionized water. It is recommended that water should contain as few ionic impurities such as a calcium ions and a magnesium ions as possible. The water should contain divalent or other ionic impurities preferably at 200 ppm or less, or more preferably at 50 ppm or less.

The above-mentioned resin particles 1, the above-mentioned inorganic fine particles 2, and the above-mentioned aqueous medium may be combined with each other to form coating film 4 at a blending ratio suitable for each application. That is, it is recommended that the content ratio of inorganic fine particles to hydrophobic particles (solid content mass ratio) be set to 20:80 to 95:5 depending on the application.

[Method of Forming Coating Film]

The method of coating a coating composition according to this embodiment is not particularly limited. It is possible to immerse the member to be coated 5 in the coating composition or to apply the coating composition onto the surface of the member to be coated 5 with a brush or the like. There is also a method of applying the coating composition as a spray.

By applying the coating composition according to this embodiment onto the member to be coated 5, followed by drying, the hydrophobic resin particles 1 are dispersed, with their hydrophobic parts protruding from the surface of the coating film, on a dense film formed with hydrophilic inorganic fine particles 2 as a base, and on the other hand, coating can be carried out so that the adhesive force between the coating composition and the member to be coated 5 is enhanced. This is because the oxidizing agent 6 can decompose hydrophilic groups 3 around the hydrophobic resin particles 1 and the decomposed hydrophilic groups 3 in an activated state can be interposed at the interface between the member to be coated 5 and the coating film.

The oxidizing agent 6 is preferably added after the inorganic fine particles 2 and the resin particles 1 are added and mixed by stirring the mixture, followed by dilution with deionized water. In the case where the oxidizing agent 6 is added without being diluted, the amount of the resin particles 1 with respect to that of the coating composition becomes larger, and hence aggregation sometimes occurs.

[Member to be Coated]

The member to be coated 5 according to the present invention is particularly suitable for use on components to which stains easily attach because of the coexistence of oily and aqueous dirt but which cannot be frequently cleaned. Thus, it is effective for use on members such as heat exchangers, fans, flaps, and similar components of an air conditioner and the like. The coating composition of the present invention can be effectively applied as a dirt prevention coating composition for not only metal components but also plastic components.

In the coating film 4 produced from the coating composition according to the present invention, the area of the hydrophilic parts formed by the hydrophilic inorganic fine particles 2 is sufficiently larger than the area formed by the hydrophobic resin particles 1 exposed on the surface of coating film 4, and hence a structure is formed in which the hydrophobic parts are scattered in the continuous hydrophilic parts. Coating film 4 has the feature that, when water droplets attach to its surface, water tends to spread because the hydrophilic parts are continuous without being separated by the hydrophobic parts.

Thus, in coating film 4 according to the present invention, the hydrophilic parts and the hydrophobic parts can coexist in a microscopic area in order to prevent the attachment of contaminants, while a highly hydrophilic state in which water tends to spread is maintained. As a result, water on the surface can be easily transferred at the time of moisture absorption and at the time of drying, and it is also possible for the attached contaminants to be removed. The effect that attached contaminants are easily removed is also provided because water is likely to flow on and penetrate the surface at the time of condensation, at the time of rain, and at the time of cleaning.

As another aspect of coating film 4 produced from the coating composition according to the present invention, is that when the area of the hydrophobic resin particles 1 exposed on the surface of coating film 4 increases, oil and static electricity can be removed and flow of water can be maintained by the continuous hydrophilic parts formed by the inorganic fine particles 2, while the hydrophobic resin particles 1 on the surface of coating film 4 can remove dust and grime effectively.

Using the coating composition according to the present invention can contribute to remarkable improvement in the adhesive force of the resultant coating film particularly with a plastic material, and hence pretreatment can be eliminated.

When a plastic material is used for the member to be coated 5, preliminarily pretreatments such as UV radiation, corona discharge treatment, flame treatment, or immersion in a chromic acid liquid are usually performed on the surface of the member to be coated 5 in order to improve the adhesive force of the plastic material with the coating composition. Thus, using the coating composition according to the present invention has the effect of eliminating the need for the aforementioned pretreatments. When the surface treatment and coating film 4 according to the present invention are used in combination, this has the affect that the surface treatment can be simplified.

Embodiment 2

The coating method according to Embodiment 2 of the present invention is a more preferable method of coating the coating composition of Embodiment 1.

That is, the coating method includes the steps of: preparing a first agent having hydrophilic inorganic fine particles 2 and hydrophobic resin particles 1 dispersed in an aqueous medium so that the solid content mass ratio is set to 70:30 to 95:5, for example; preparing a second agent by adding, to the first agent, an oxidizing agent 6 containing at least one of a peroxide, a perchloric acid, a chlorate, a persulfuric acid, a superphosphoric acid, and a periodate at a ratio of 0.5 to 30, for example, when the total mass of the solid content of the resin particles 1 is defined as 100; applying the second agent onto a member to be coated 5; and drying the second agent on the member to be coated 5.

By adopting the coating method according this embodiment, it is possible to form firmly, on the surface of the member to be coated 5, a coating film 4 in which the hydrophobic resin particles 1 are dispersed, with their hydrophobic parts protruding from the surface of the coating film 4, in a dense film using the hydrophilic inorganic fine particles 2 as a base. By adding the oxidizing agent in the second agent just before performing coating of the member to be coated 5, a hydrophilic group 3 around the hydrophobic resin particles 1 can be decomposed and the hydrophobic parts can be dispersed on the surface of the coating film 4. Further, the decomposed hydrophilic group 3 in an activated state can be interposed at the interface between the member to be coated 5 and the coating film 4, and hence a powerful adhesive force is expressed.

After coating, drying may be performed at room temperature or drying may be performed under heating. When drying is performed at room temperature, promoting drying by airflow is preferred for the purpose of shortening the drying time. When drying is performed under heating, warm air may be blown or heating may be performed in a drying furnace. The purpose of this drying is to help the inorganic fine particles to form a film and eliminate the liquidity.

Embodiment 3

The coating method according to Embodiment 3 of the present invention is a more preferable method of coating the coating composition of Embodiment 1.

That is, the coating method includes the steps of: preparing a coating composition having hydrophilic inorganic fine particles 2 and hydrophobic resin particles 1 dispersed in an aqueous medium so that the solid content mass ratio is set to 70:30 to 95:5, for example; and having added thereto an oxidizing agent 6 containing at least one of a peroxide, a perchloric acid, a chlorate, a persulfuric acid, a superphosphoric acid, and a periodate at a ratio of 0.5 to 30, for example, when the mass of the solid content of the resin particle is defined as 100; applying the coating composition onto a member to be coated 5; and heating the coating composition on the member to be coated 5.

By adopting the coating method according this embodiment, it is possible to form firmly, on the surface of the member to be coated 5, a coating film 4 in which the hydrophobic resin particles 1 are dispersed, with their hydrophobic parts protruding from the surface of the coating film 4, in a dense film using a hydrophilic inorganic fine particles 2 as a base.

This is because, by heating the oxidizing agent 6 in the coating composition after the member to be coated 5 is coated with the coating composition, a hydrophilic groups 3 around each hydrophobic resin particle 1 can be decomposed and the decomposed hydrophilic groups 3 in an activated state can be interposed at the interface between the member to be coated 5 and the coating film 4. Further, the heating has the effect of firmly bonding the hydrophilic inorganic fine particles 2 and the member to be coated 5.

The heating in this embodiment can be performed by using warm air, infrared rays, or a heating furnace. When the heating temperature is controlled to 40° C. to 90° C., hydrophilic groups 3 around each hydrophobic resin particle 1 can be decomposed, and the occurrence of cracks caused by rapid drying in the coating film 4 can be suppressed.

Note that brushing, spraying, or immersion may be adopted as an application method in the step of applying the coating composition onto the member to be coated 5 described in Embodiments 2 and 3 mentioned above. In particular, in order to produce a coating film 4 free of unevenness, it is preferred that the coating composition be applied by immersion, followed by removal of the excessive part of the coating composition by airflow. When the member to be coated 5 is immersed in the coating composition, the member to be coated 5 is slowly raised and rotated, thereby allowing removal of the excessive part of the coating composition and suppressing brushing unevenness. Further, in order to make the film thickness thicker, it is recommended that the above-mentioned coating step is repeated.

Embodiment 4

The coating method according to Embodiment 4 of the present invention is a more preferable method of coating the coating composition of Embodiment 1.

That is, the coating method includes the step of: preparing a first agent having hydrophilic inorganic fine particles 2 and hydrophobic resin particles 1 mixed in an aqueous medium so that the solid content mass ratio of the inorganic fine particles 2 to that of the resin particles 1 is set to 20:80 to 30:70; preparing a second agent by adding, to the first agent, an oxidizing agent 6 containing at least one of a peroxide, a perchloric acid, a chlorate, a persulfuric acid, a superphosphoric acid, and a periodate at a ratio of 0.1 to 30 when the mass of the solid content of the resin particles 1 is defined as 100; applying the second agent onto a member to be coated 5; and drying the second agent on the member to be coated 5.

Even in the case where the content of the hydrophobic resin particles 1 is increased, it is possible to form firmly, on the member to be coated 5, a coating film 4 in which the hydrophobic resin particles 1 are dispersed, with their hydrophobic parts protruding from the surface of the coating film, on a dense film using the hydrophilic inorganic fine particles 2 as a base.

The oxidizing agent 6 in the second agent may be added just before performing coating of the member to be coated 5 as in Embodiment 2, or the oxidizing agent 6 may be preliminarily mixed in the coating composition and a reaction may be initiated or promoted by heating as in Embodiment 3. In any case, the same effects as in Embodiments 2 and 3 can be obtained.

Note that, in Embodiments 3 and 4, cases in which the solid content mass ratio of the inorganic fine particles 2 to that of the resin particles 1 was set to 70:30 to 95:5 and 20:80 to 30:70, and the mass rate of the oxidizing agent 6 was set to 0.5 to 30 and 0.1 to 30, when the mass of the solid content of the resin particles 1 was defined as 100, were respectively described, but any range can be selected depending on the application and required function of the coating film.

In particular, when the content of the resin particles 1 is larger relative to that of the inorganic fine particles 2, the content ratio of the oxidizing agent 6 is preferably 0.5 to 20. If the content ratio is less than 0.5, it is not possible to sufficiently obtain the effect of decomposing hydrophilic groups 3 attributed to the dispersant, surfactant, stabilizer, and the like surrounding each resin particle 1. On the other hand, if the content ratio is more than 20, the balance in content ratio between the resin particles 1 and the inorganic fine particles 2 on the surface of the coating film 4 is disrupted and sufficient dirt prevention properties cannot be provided. In addition, the adhesiveness between the coating film 4 and the member to be coated 5 is not sufficiently provided.

Embodiment 5

Figure 3:
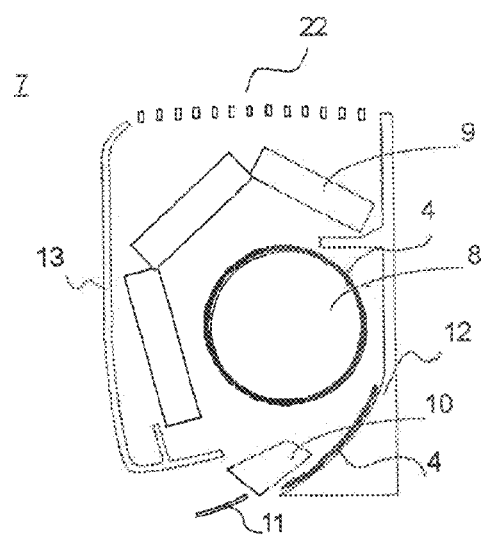
FIG. 3 is a schematic cross-sectional view of an air conditioner according to Embodiment 5 of the present invention.

FIG. 3 shows a schematic cross-sectional view of an air conditioner according to Embodiment 5 of the present invention. In FIG. 3, an air conditioner 7 includes an intake opening 22 for taking in a gas, a heat exchanger 9 for exchanging heat of a gas taken in from the intake opening 22, a fan 8 for circulating the gas whose heat has been exchanged by the heat exchanger 9, an air path-forming member 12 for forming a path for the gas sent by the fan 8, a vane 10 and a flap 11 for introducing the gas sent by the air path-forming member 12, and a cover 13 for including the heat exchanger 9 and the fan 8 inside. Then, coating film 4 is formed on the surface of the fan 8 and an inner partial surface of the air path-forming member 12 by applying the coating composition of the present invention.

Here, cases in which the coating film 4 is formed at sites at which high dirt prevention properties are particularly required are shown. However, it is recommended that coating film 4 be formed on a surface of at least one of the fan 8, the heat exchanger 9, the vane 10, the flap 11, the air path-forming member 12, and the cover 13 by applying the coating composition of the present invention.

The blending ratio of each component can be determined in view of the function of each site. For example, coating film 4 including the inorganic fine particles 2 at a higher ratio is formed on the heat exchanger 9, which is required to have water flow to a certain extent, and a coating film 4 including the hydrophobic resin particles 1 at a higher ratio is formed on the fan 8 or the air path-forming member 12, to each of which grime is liable to attach.

Figure 4:
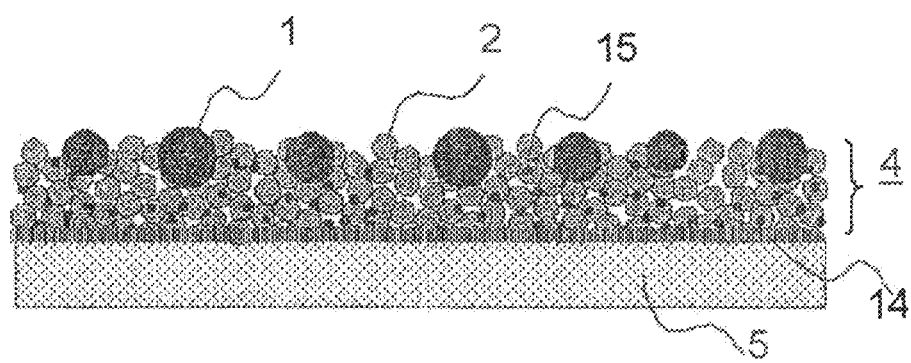
FIG. 4 is a schematic cross-sectional view of a coating film formed on a component according to Embodiment 5 of the present invention.

As shown in FIG. 4, hydrophobic resin particles 1 for removing dirt stains are arranged on the surface of a coating film 4 formed on the above-mentioned components serving as a member to be coated 5, and adhesion reinforcing layer 14 is formed at the interface between the coating film 4 and the member to be coated 5. In FIG. 4, a reaction product of an oxidizing agent 6 is represented by 15.

That is, in the air conditioner according to this embodiment, there is formed, on each of the surfaces of the heat exchanger 9, the fan 8, and the air path-forming material 12, which are components, via the adhesion reinforcing layer 14, a coating film 4 including resin particles having an average particle diameter of 50 nm to 500 nm, inorganic fine particles having an average particle diameter of 15 nm or less, and a reaction product of an oxidizing agent 6 containing at least one of a peroxide, perchloric acid, a chlorate, persulfuric acid, superphosphoric acid, and a periodate.

Thus, dirt stains on each component on which coating film 4 is formed can be removed in the air conditioner, and each component can be always kept in a clean state. Further, even if the amount of air becomes larger, peeling of coating film 4 can be suppressed. The frequency of cleaning can be decreased, and even if a wiping work for cleaning components is carried out, peeling of coating film 4 can be prevented because coating film 4 is firmly formed via the adhesion reinforcing layer 14. As a result, the air conditioner has excellent maintenance characteristics.

It is possible to appropriately select which component is subjected to coating.

Embodiment 6

Figure 5:
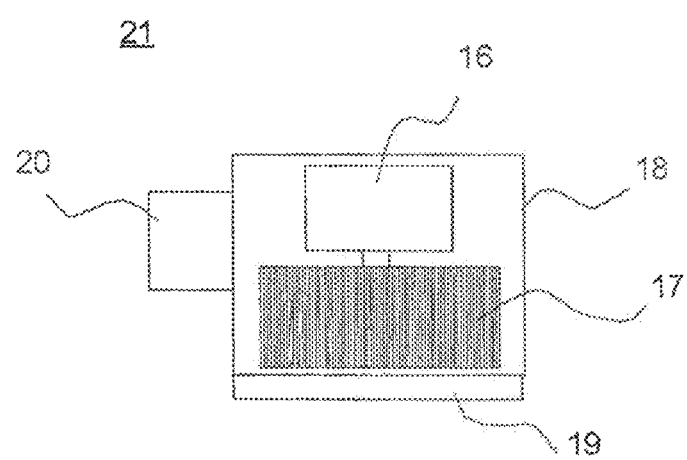
FIG. 5 is a schematic cross-sectional view of a ventilation fan according to Embodiment 6 of the present invention.

FIG. 5 shows a schematic cross-sectional view of a ventilation fan according to Embodiment 6 of the present invention. In FIG. 5, a ventilation fan 21 includes a gas inlet 19, a blade body 17 arranged in a passage for a gas taken in from the gas inlet 19, a motor 16 for rotating the blade body 17, a gas outlet 20 for discharging the gas by using a gas flow formed by the blade body 17 rotated with the motor 16, and a chassis 18 for including the blade body 17 inside, the chassis 18 being connected to the gas outlet 20 and the gas inlet 19. Then, coating film 4 is formed on the surface of the blade body 17 by applying the coating composition of the present invention.

It is recommended to form coating film 4 including inorganic fine particles 2 at a slightly higher ratio so as for hydrophobic resin particles 1 to disperse properly in a base formed of the inorganic fine particles 2, on the blade body 17, to which grime is particularly liable to attach. On the surface of the blade body 17, the hydrophobic resin particles 1 for removing dirt stains are arranged, and an adhesion reinforcing layer 14 is formed at the interface between the coating film 4 and the member to be coated 5.

That is, in the ventilation fan according to this embodiment, there is formed, on the surface of the blade body 17, which is a component, via the adhesion reinforcing layer 14, a coating film 4 including resin particles having an average particle diameter of 50 nm to 500 nm, inorganic fine particles having an average particle diameter of 15 nm or less, and a reaction product of an oxidizing agent 6 containing at least one of a peroxide, perchloric acid, a chlorate, persulfuric acid, superphosphoric acid, and a periodate.

Thus, dirt stains on the blade body 17, on which the coating film 4 is formed can be removed in the ventilation fan 21, and the blade body 17 can be always kept in a clean state. Further, even if the amount of air becomes larger, peeling of the coating film 4 can be suppressed. The frequency of cleaning can be decreased, and even if wiping work for cleaning components is carried out, peeling of coating film 4 can be prevented because coating film 4 is firmly formed via the adhesion reinforcing layer 14. As a result, the ventilation fan has excellent maintenance characteristics.

In particular, when a coating film 4 is formed on the whole blade body 17, reduction in ventilation air volume and noise aggravation caused by clogging between blades can be suppressed. Coating may be performed on components other than the blade body 17.

In Embodiment 5 and Embodiment 6, an air conditioner and a ventilation fan were used as examples to describe the present invention. Note that the present invention can be used for various components for electrical equipment such as elevators, refrigerators, and solar batteries. The material to be coated 5 is not particularly limited, but using the coating composition on a plastic member made of, for example, polypropylene, polystyrene, an ABS resin, or an ASG resin is effective because adhesive strength can be ensured.

EXAMPLES

Hereinafter, specific examples are shown to describe detailed experimental results about the dirt prevention properties, hydrophilicity, and adhesiveness of the coating composition of the present invention and the characteristics of the coating composition. A member to be coated 5 made of stainless steel and one made of a plastic were used. Note that the examples shown below do not limit the scope of the present invention.

In each of Examples 1 to 9 and Comparative Examples 1 to 4, a coating film 4 was formed using a stainless steel substrate measuring 100 mm long by 30 mm wide by 1 mm thick as a material to be coated 5.

The following coating compositions were prepared in Examples 1 to 9.

Example 1

Deionized water as an aqueous medium, a titanium oxide sol having an average particle diameter of 10 nm (manufactured by Showa Denko K.K.) as hydrophilic inorganic fine particles 2, a polyolefin dispersion having an average particle diameter of 200 nm (manufactured by Sumitomo Seika Chemicals Company, Limited) as hydrophobic resin particles 1, and hydrogen peroxide as an oxidizing agent 6 were prepared. The titanium oxide sol at 2 mass %, the polyolefin dispersion at 0.5 mass %, and hydrogen peroxide at 0.01 mass % were mixed by stirring, to prepare a coating composition.

Example 2

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and hydrogen peroxide as an oxidizing agent 6 were prepared. The colloidal silica at 2 mass %, the PTFE dispersion at 0.5 mass %, and hydrogen peroxide at 0.01 mass % were mixed by stirring, to prepare a coating composition.

Example 3

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and hydrogen peroxide as an oxidizing agent 6 were prepared. The colloidal silica at 3 mass %, the PTFE dispersion at 5 mass %, and hydrogen peroxide at 0.1 mass % were mixed by stirring, to prepare a coating composition.

Example 4

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and hydrogen peroxide as an oxidizing agent 6 were prepared. The colloidal silica at 2.3 mass %, the PTFE dispersion at 0.1 mass %, and hydrogen peroxide at 0.005 mass % were mixed by stirring, to prepare a coating composition.

Example 5

Deionized water as an aqueous medium, a colloidal silica having an average particle diameter of 15 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and hydrogen peroxide as an oxidizing agent 6 were prepared. The colloidal silica at 2 mass %, the PTFE dispersion at 0.5 mass %, and hydrogen peroxide at 0.01 mass % were mixed by stirring, to prepare a coating composition.

Example 6

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 500 nm (manufactured by Asahi Glass Company, Limited) as hydrophobic resin particles 1, and hydrogen peroxide as an oxidizing agent 6 were prepared. The colloidal silica at 2 mass %, the PTFE dispersion at 0.5 mass %, and hydrogen peroxide at 0.01 mass % were mixed by stirring, to prepare a coating composition.

Example 7

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and hydrogen peroxide as an oxidizing agent 6 were prepared. The colloidal silica at 2 mass %, the PTFE dispersion at 0.5 mass %, and hydrogen peroxide at 0.0025 mass % were mixed by stirring, to prepare a coating composition.

Example 8

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and ammonium persulfate as an oxidizing agent 6 were prepared. The colloidal silica at 4.5 mass %, the PTFE dispersion at 0.5 mass %, and ammonium persulfate at 0.01 mass % were mixed by stirring, to prepare a coating composition.

Example 9

Deionized water as an aqueous medium, a colloidal silica having an particle diameter of 5 nm (manufactured by Nissan Chemical Industries, Ltd) as hydrophilic inorganic fine particles 2, a PTFE dispersion having an average particle diameter of 150 nm (manufactured by Asahi Glass Company, Limited) as hydrophobic resin particles 1, and ammonium persulfate as an oxidizing agent 6 were prepared. The colloidal silica at 2 mass %, the PTFE dispersion at 5.5 mass %, and ammonium persulfate at 0.01 mass % were mixed by stirring, to prepare a coating composition.

The following coating compositions were prepared in Comparative Examples 1 to 4.

Comparative Example 1

Deionized water as an aqueous medium, a colloidal silica having an average particle diameter of 5 nm (manufactured by Nissan Chemical Industries, Ltd.) as hydrophilic inorganic fine particles 2, and a PTFE dispersion having an average particle diameter of 200 nm (manufactured by Asahi Glass Company, Limited) as hydrophobic resin particles 1 were prepared. The colloidal silica at 2 mass % and the PTFE dispersion at 0.5 mass % were mixed by stirring, to prepare a coating composition free of an oxidizing agent 6.

Comparative Example 2

Deionized water as an aqueous medium, a colloidal silica having an average particle diameter of 5 nm (manufactured by Nissan Chemical Industries, Ltd.) as hydrophilic inorganic fine particles 2, and hydrogen peroxide as an oxidizing agent 6 were prepared. The colloidal silica at 2.3 mass % and hydrogen peroxide at 0.01 mass % were mixed by stirring, to prepare a coating composition free of resin particles 1.

Comparative Example 3

Deionized water as an aqueous medium, a PTFE dispersion having an average particle diameter of 200 nm (manufactured by Asahi Glass Company, Limited) as hydrophobic resin particles 1, and hydrogen peroxide as an oxidizing agent 6 were prepared. The PTFE dispersion at 0.5 mass %, hydrogen peroxide at 0.01 mass %, and a colloidal silica having an average particle diameter of 30 nm (manufactured by Nissan Chemical Industries, Ltd.) were mixed by stirring, to prepare a coating composition including a colloidal silica having a large average particle diameter.

Comparative Example 4

Deionized water as an aqueous medium, a colloidal silica having an average particle diameter of 5 nm (manufactured by Nissan Chemical Industries, Ltd.) as hydrophilic inorganic fine particles 2, and a PTFE dispersion having an average particle diameter of 250 nm (manufactured by Asahi Glass Company, Limited) as hydrophobic resin particles 1 were prepared. The colloidal silica at 2 mass %, the PTFE dispersion at 0.5 mass %, and sodium chlorite at 0.01 mass % were mixed by stirring, to prepare a coating composition using, as an oxidizing agent 6, sodium chlorite, which is weaker in oxidizing ability.

Table 1 shows the blending ratio of the components and the like of the coating composition of each of Examples 1 to 9 and Comparative Examples 1 to 4.

stainless steel substrate 5, and blowing off excessive liquid by blowing air. Then, the properties, initial contact angle θ, and dirt prevention performance of each resultant coating film 4 were evaluated. Here, the properties of coating film 4 were evaluated by visual observation. The contact angle θ was measured by using a contact angle meter (DM 100 manufactured by Kyowa Interface Science Co., LTD.). The dirt prevention performance was evaluated on the basis of the attachment of soil dust, which is a hydrophilic fouling substance, and the attachment of carbon dust, which is a hydrophobic fouling substance.

The attachment of the hydrophilic dirt substances was evaluated on the basis of the measurements of soil dust adhesive properties obtained by using JIS Kanto loam red dust having a main particle diameter of 1 to 3 μm. Specifically, Kanto loam dust was blown by air so as to attach to the surface of a coating film, and coloring caused by the attachment of the Kanto loam dust was visually observed to perform a 5-stage evaluation. In this evaluation, a coating film on which Kanto loam dust is barely attached is defined as 1, and a coating film on which a large amount of Kanto loam dust is attached is defined as 5. Further, when the attachment of the hydrophobic dirt substance was evaluated, oily carbon black dust was blown by air so as to attach to the

TABLE 1

| | Inorganic fine particles | | | Resin particles | | | | Oxidizing agent | |
| --- | --- | --- | --- | --- | --- | --- | --- | --- | --- |
| | Type | Content with respect to mass of aqueous medium (mass %) | Particle diameter (nm) | Type | Content with respect to mass of aqueous medium (mass %) | Particle diameter (nm) | Solid content mass ratio (inorganic fine particles):(resin particles) | Type | Content ratio when the mass of resin particles is defined as 100 |
| Example 1 | Titanium oxide | 2.0 | 10 | Polyolefin | 0.5 | 200 | 80:20 | Hydrogen peroxide | 2.0 |
| Example 2 | Silica | 2.0 | 5 | PTFE | 0.5 | 200 | 80:20 | Hydrogen peroxide | 2.0 |
| Example 3 | Silica | 3.0 | 5 | PTFE | 5 | 200 | 38:63 | Hydrogen peroxide | 2.0 |
| Example 4 | Silica | 2.3 | 5 | PTFE | 0.1 | 200 | 96:4 | Hydrogen peroxide | 5.0 |
| Example 5 | Silica | 2.0 | 15 | PTFE | 0.5 | 200 | 80:20 | Hydrogen peroxide | 2.0 |
| Example 6 | Silica | 2.0 | 5 | PTFE | 0.5 | 500 | 80:20 | Hydrogen peroxide | 2.0 |
| Example 7 | Silica | 2.0 | 5 | PTFE | 0.5 | 200 | 80:20 | Hydrogen peroxide | 0.5 |
| Example 8 | Silica | 4.5 | 5 | PTFE | 0.5 | 200 | 90:10 | Ammonium persulfate | 2.0 |
| Example 9 | Silica | 2.0 | 5 | PTFE | 5.5 | 150 | 27:73 | Ammonium persulfate | 0.2 |
| Comparative Example 1 | Silica | 2.0 | 5 | PTFE | 0.5 | 200 | 80:20 | — | — |
| Comparative Example 2 | Silica | 2.3 | 5 | — | — | — | 100:0 | Hydrogen peroxide | — |
| Comparative Example 3 | Silica | 2.3 | 30 | PTFE | 0.5 | 200 | 82:18 | Hydrogen peroxide | 2.0 |
| Comparative Example 4 | Silica | 2.0 | 5 | PTFE | 0.5 | 250 | 80:20 | Sodium chlorite | 2.0 |

The coating composition of each of Examples 1 to 9 and Comparative Examples 1 to 4 were used to form coating film 4 by a method involving applying the composition to a surface of a coating film, and coloring caused by the attachment of carbon black dust was visually observed to perform a 5-stage evaluation. In this evaluation, a coating film on which carbon black dust is barely attached is defined as 1, and a coating film on which a large amount of carbon black dust is attached is defined as 5. The results of the evaluations are shown in Table 2.

TABLE 2

| Film | | Soil dust adhesive property | Carbon black adhesive property | Initial contact angle θ |
|---|---|---|---|---|
| Example 1 | Slightly cloudy film | 3 | 3 | 29 |
| Example 2 | Transparent film | 1 | 1 | 11 |
| Example 3 | Transparent film | 1.5 | 3.5 | 28 |
| Example 4 | Transparent film | 3.5 | 1 | 14 |
| Example 5 | Transparent film | 2.5 | 3 | 25 |
| Example 6 | Transparent film | 2 | 3.5 | 23 |
| Example 7 | Transparent film | 3 | 1 | 13 |
| Example 8 | Transparent film | 2.5 | 1.5 | 12 |
| Example 9 | Slightly cloudy film | 2.5 | 3 | 26 |
| Comparative Example 1 | Transparent film | 4 | 2 | 13 |
| Comparative Example 2 | Transparent film | 5 | 2 | 11 |
| Comparative Example 3 | Slightly cloudy film | 4 | 4 | 32 |
| Comparative Example 4 | Transparent film | 4.5 | 3 | 20 |

The experimental results shown in Table 2 show that coating films 4 formed by using the coating compositions of Examples 1 to 8 each exhibited excellent dirt prevention properties for both hydrophilic and hydrophobic dirt substances. Further, the results of Examples 2 to 8 show that coating film 4 using silica fine particles as inorganic fine particles 2 and fluororesin particles as resin particles 1 exhibited good performance. The coating film 4 of the examples of the present invention each include a continuously formed hydrophilic silica film as its base, and hence the contact angles generally exhibit low values. However, in micro-regions (in a microscopic view), hydrophilic silica fine particles and hydrophobic fluororesin particles are alternately arranged continuously at a nano-level. Further, when the arranged resin particles 1 form coating film 4, some hydrophilic groups 3 which exist around each resin particle 1 are cleaved by oxidizing agent 6 when it is added and the number of hydrophilic groups 3 on the surface of the each resin particle 1 decreases. As a result, the resin particles 1 improve the hydrophobic function of the coating film 4.

Further, by adjusting the contents (weight ratio) of the silica fine particles and the fluororesin particles, the dirt prevention performance of the resultant coating film 4 is able to be adjusted. When the content ratio of the silica fine particles increases, the attachment of a hydrophobic dirt substance can be suppressed, and when the content ratio of fluorine increases, the attachment of a hydrophilic dirt substance can be suppressed. It is found that the attachment amounts of both the hydrophilic dirt substance and hydrophobic dirt substance are the lowest in the case of Example 2, in which the solid content mass ratio of the silica fine particles to that of the fluororesin particles is 80:20.

In addition, by using the coating composition of each of Examples 2 to 8, it was possible to form a thin coating film having a uniform thickness. It was confirmed by electron microscope images that each coating film was a thin film having a thickness of about 100 nm to 200 nm. In addition, the resultant coating film was transparent. In the case of Example 9, in which the content of the fluororesin particles was larger, slight aggregation was confirmed, and thus the coating film formed was slightly white.

On the other hand, in the case of Comparative Example 1, an oxidizing agent 6 was not added, and hence hydrophilic groups 3 attributable to a surfactant and the like remain on the surface of each fluororesin particle in coating film 4. As a result, the surface of each scattering fluororesin particle only weakly functions as a hydrophobic part, and hence the attachment of hydrophilic dirt substance is liable to occur. Further, in the case of Comparative Example 2, the coating film formed of only silica fine particles (mass of silica fine particles:mass of fluororesin particles=100:0) has no minute unevenness produced by the fluororesin particles, and hence the area of attachment is broad, resulting in a significant reduction in the overall dirt prevention effect of the coating film.

Further, in the case of Comparative Example 3, cracks occurred because each silica particle had a large particle diameter, and hence dirt stains were easily caught by the cracks, resulting in poor dirt prevention performance. Thus, silica particle needs to have a fine particle diameter. In the case of Comparative Example 4, it is assumed that sodium chlorite cannot sufficiently cleave hydrophilic groups on the surface of each resin particle, and hence poor dirt prevention performance is exhibited.

Next, a similar experiment was performed using a plastic flat substrate (material: polystyrene, white plate) measuring 100 mm long by 10 mm wide by 2 mm thick as a material to be coated 5. The following coating compositions were prepared in Examples 10 to 12 and Comparative Examples 5 to 7.

Example 10

The same coating composition as that in Example 2 was prepared.

Example 11

Deionized water, a colloidal silica having an average particle diameter of 5 nm (manufactured by Nissan Chemical Industries, Ltd.) at 1.7 mass %, a PTFE dispersion having an average particle diameter of 200 nm (manufactured by Asahi Glass Company, Limited) at 5 mass %, and hydrogen peroxide as an oxidizing agent 6 at 0.1 mass % were mixed by stirring, to prepare a coating composition.

Example 12

Deionized water, a colloidal silica having an average particle diameter of 5 nm (manufactured by Nissan Chemical Industries, Ltd.) at 3 mass %, a PTFE dispersion having an average particle diameter of 200 nm (manufactured by Asahi Glass Company, Limited) at 0.25 mass %, and hydrogen peroxide as an oxidizing agent 6 at 0.01 mass % were mixed by stirring, to prepare a coating composition.

The following coating compositions were prepared in Comparative Examples 5 to 7.

Comparative Example 5

Deionized water, a colloidal silica having an average particle diameter of 20 nm (manufactured by Nissan Chemical Industries, Ltd.) at 2 mass % and a PTFE dispersion having an average particle diameter of 200 nm (manufactured by Asahi Glass Company, Limited) at 0.5 mass % were mixed by stirring, to prepare a coating composition.

Comparative Example 6

Deionized water, a colloidal silica having an average particle diameter of 5 nm (manufactured by Nissan Chemical Industries, Ltd.) at 3 mass %, and hydrogen peroxide as an oxidizing agent 6 at 0.01 mass % were mixed by stirring, to prepare a coating composition free of resin particles 1.

Comparative Example 7

In Comparative Example 7, deionized water, a colloidal silica having an average particle diameter of 20 nm (manufactured by Nissan Chemical Industries, Ltd.) at 2 mass %, a PTFE dispersion having an average particle diameter of 200 nm (manufactured by Asahi Glass Company, Limited) at 0.5 mass %, and sodium chlorite as a decomposition agent at 0.01 mass % were mixed by stirring, to prepare a coating composition.

A plastic flat plate 5 was immersed in the coating composition prepared in each of Examples 10 to 12 and Comparative Examples 5 to 7, and was drawn up slowly, thereby forming coating film 4.

The coating compositions of Examples 10 to 12 and Comparative Examples 5 and 6 were subjected to heating at 60° C. for 18 hours. The coating composition of Comparative Example 7 was subjected to drying at 25° C. for 18 hours.

Table 3 shows the blending ratio of the components of the coating composition of each of Examples 10 to 12 and Comparative Examples 5 to 7.

The property, initial contact angle θ, and dirt prevention performance of each resultant coating film were evaluated in the same manner as that in the aforementioned experiments using the stainless steel substrate.

Further, evaluation on the adhesiveness of coating film 4 was carried out by the following method. A piece of gauze was folded and dampered with water. The gauze was pressed on a coating surface with a pressing surface of 5 cm square, and was subjected to a reciprocating motion in a 10 cm distance while a weight of 100 g weight/cm² was being applied. The number of reciprocating motions until the start of detachment of the coating film 4 was used as an indication of the strength of the adhesiveness.

TABLE 4

| Film | | Soil dust adhesive property | Carbon black adhesive properly | Number of reciprocating motions until detachment | Initial contact angle θ |
|---|---|---|---|---|---|
| Example 10 | Transparent film | 2.5 | 2 | 52 | 26 |
| Example 11 | Transparent film | 1 | 3.5 | 60 | 32 |
| Example 12 | Transparent film | 3 | 1 | 48 | 12 |
| Comparative Example 5 | Transparent film | 4.5 | 3 | 2 | 36 |
| Comparative Example 6 | — | — | — | — | — |
| Comparative Example 7 | Transparent film | 3.5 | 3.5 | 2 | 16 |

The experimental results shown in Table 4 show that each coating film 4 formed by using the coating composition of each of Examples 9 to 11 exhibited excellent dirt prevention performance against both hydrophilic and hydrophobic dirt substances. Further, the coating film clearly provided an improved adhesive effect, compared with the case of Comparative Example 5, in which no oxidizing agent 6 was added. In the case of Comparative Example 6, in which the coating composition was formed of only silica fine particles, coating film 4 could not be formed on the plastic member the surface of which was highly water repellent. Further, in the case of Example 10, because the amount of silica fine particles was increased, the coating film 4 showed improvement in its hydrophilicity and exhibited excellent dirt prevention performance for both hydrophilic and hydrophobic dirt substances.

On the other hand, the case of Comparative Example 5 shows the attachment of a large amount of soil dust. It is assumed that, because no oxidizing agent 6 was added, the number of hydrophilic groups on the surface of each fluo-

TABLE 3

| | | Inorganic fine particles | | | Resin particles | | Solid content | Oxidizing agent | | |
|---|---|---|---|---|---|---|---|---|---|---|
| | Type | Content with respect to mass of aqueous medium (mass %) | Average particle diameter (nm) | Type | Content with respect to mass of aqueous medium (mass %) | Average particle diameter (nm) | mass ratio (inorganic fine particles):(resin particles) | Type | Content ratio when the mass of resin particles is defined as 100 | Heating time |
| Example 10 | Silica | 2 | 5 | PTFE | 0.5 | 200 | 80:20 | Hydrogen peroxide | 2.0 | 60° C., 18 hours |
| Example 11 | Silica | 1.7 | 5 | PTFE | 5 | 200 | 25:75 | Hydrogen peroxide | 2.0 | 60° C., 18 hours |
| Example 12 | Silica | 2.3 | 5 | PTFE | 0.25 | 200 | 90:10 | Hydrogen peroxide | 4.0 | 60° C., 18 hours |
| Comparative Example 5 | Silica | 2 | 5 | PTFE | 0.5 | 200 | 80:20 | — | — | 60° C., 18 hours |
| Comparative Example 6 | Silica | 2.3 | 5 | — | — | — | 100:0 | Hydrogen peroxide | — | 60° C., 18 hours |
| Comparative Example 7 | Silica | 2.3 | 20 | PTFE | 0.5 | 200 | 80:20 | Sodium chlorite | 2.0 | 25° C., 18 hours | roresin particle scattering in the resultant coating film 4 could not be reduced, and hence each of the fluororesin particles do not sufficiently function as the hydrophobic part. Also shown is the result that the coating film 4 has weak adhesiveness to the plastic member 6. Further, the case of Comparative Example 7 also showed lack of adhesiveness.

In each of Examples 13 to 19 and Comparative Example 8, coating film 4 was formed using a plastic substrate made of polypropylene and measuring 100 mm long by 30 mm wide by 1 mm thick as a material to be coated 5.

Example 13

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 200 nm (manufactured by Asahi Glass Company, Limited) as hydrophobic resin particles 1, and ammonium sulfate (A) as an oxidizing agent 6 was prepared. The colloidal silica at 2 mass %, the PTFE dispersion at 0.5 mass %, and the oxidizing agent at 0.05 mass % were added and mixed by stirring, to prepare a coating composition.

Example 14

A coating composition was prepared in the same manner as that of Example 13, except that sodium sulfate (B) was prepared as an oxidizing agent 6.

Example 15

A coating composition was prepared in the same manner as that of Example 13, except that sodium bicarbonate (C) was prepared as an oxidizing agent 6.

Example 16

A coating composition was prepared in the same manner as that of Example 13, except that sodium sulfite (D) was prepared as an oxidizing agent 6.

Example 17

A coating composition was prepared in the same manner as that of Example 13, except that hydrogen peroxide (E) was prepared as an oxidizing agent 6.

Example 18

A coating composition was prepared in the same manner as that of Example 13, except that ammonium persulfate (F) was prepared as an oxidizing agent 6.

Example 19

A coating composition was prepared in the same manner as that of Example 13, except that sodium persulfate (G) was prepared as an oxidizing agent 6.

Comparative Example 8

A coating composition was prepared in the same manner as that of Example 13, except that no oxidizing agent 6 was added (H).

A plastic substrate was immersed in the coating composition according to each of Examples 13 to 19 and Comparative Example 8, and was drawn up slowly, followed by drying, thereby forming a coating film. A piece of gauze was pressed on each coating film with a pressing surface of 5 cm square, and was subjected to a reciprocating motion in a 10 cm distance while a weight of 1 kg weight/cm$^2$ was being applied. The number of reciprocating motions until the start of detachment of the coating film was used as an indication for the strength of the adhesiveness. Evaluation on the adhesiveness was performed on the basis of the indication.

Figure 6:
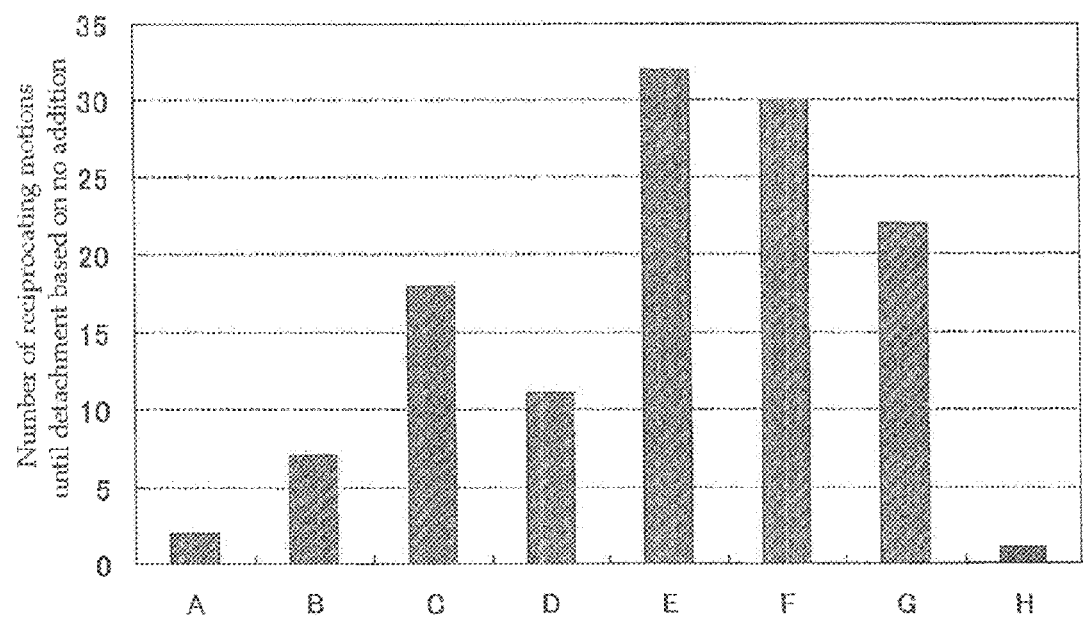
FIG. 6 is a graph comparatively showing the number of reciprocating motions until detachment of each coating film according to Examples 13 to 19 of the present invention and that of a coating film according to Comparative Example 8.

As shown in FIG. 6, it was found that the coating film according to each of Examples 13 to 19 (A to G), in each of which an oxidizing agent 6 was added, exhibited a larger number of reciprocating motions until the start of detachment and therefore had better adhesiveness than the coating film according to Comparative Example 8 (H), in which no oxidizing agent 6 was added.

Particularly excellent adhesiveness was exhibited in the coating film according to Example 17, Example 18, and Example 19, in which hydrogen peroxide (E), ammonium persulfate (F), and sodium persulfate (G), which are peroxidative agents, were used as the oxidizing agent 6 respectively.

From the foregoing, it is found that adhesiveness can be ensured even if surface treatment such as UV radiation treatment or corona discharge treatment is not preliminarily applied to a plastic substrate which has intrinsically poor in adhesiveness.

In each of Examples 21 and 22, a coating film 4 was formed using a plastic substrate made of polypropylene and measuring 100 mm long by 30 mm wide by 1 mm thick was used as a material to be coated 5.

Example 20

Deionized water as an aqueous medium, a colloidal silica having an average particle diameter of 5 nm (manufactured by Nissan Chemical Industries, Ltd.) as hydrophilic inorganic fine particles 2, a PTFE dispersion having an average particle diameter of 250 nm (manufactured by Asahi Glass Company, Limited) as hydrophobic resin particles 1, and hydrogen peroxide as an oxidizing agent 6 were prepared. The colloidal silica at 0.3 mass %, the PTFE dispersion at 1.1 mass %, and the oxidizing agent at 0.05 mass % were added and mixed by stirring, to prepare a coating composition.

Example 21

An aqueous medium, inorganic fine particles 2, resin particles 1, and an oxidizing agent 6 were prepared in the same manner as that in Example 20. The colloidal silica at 1.4 mass %, the PTFE dispersion at 0.6 mass %, and the oxidizing agent at 0.05 mass % were added and mixed by stirring, to prepare a coating composition.

Each coating composition produced by changing the mass ratio of the solid content of inorganic fine particles 2 and resin particles 1 as shown in Table 5 was coated on a plastic substrate made of polypropylene and measuring 100 mm long by 30 mm wide by 1 mm thick. The transparency and adhesiveness of each resulting coating film 4 were evaluated in the same manner as that in Examples 10 to 12.

The content ratio of the oxidizing agent 6 is more preferably 2 or more and 10 or less when the mass of the solid content of the resin particles 1 is defined as 100. When the content ratio is less than 2, the effect of decomposing hydrophilic groups 3 being attributable to a dispersant, a surfactant, a stabilizer, and the like and existing around each resin particle 1 is not sufficiently provided. When the content ratio is more than 10, the content of the oxidizing agent 6 is too large for the coating film to include the desired resin particles 1 and desired inorganic fine particles 2, resulting in insufficient dirt prevention function.

Table 6 shows the results. From the results, it was found that, when the content ratio of the resin particles was high, the hydrophobic carbon black dust adhesive properties became slightly worse, but the transparency and adhesiveness were good. On the other hand, it was found that, when the content ratio of the inorganic fine particles was increased, the hydrophilic soil dust adhesive properties became slightly worse, but the transparency was good and adhesiveness was maintained.

TABLE 5

| | Inorganic fine particles | | | Resin particles | | | Solid content | Oxidizing agent | |
|---|---|---|---|---|---|---|---|---|---|
| | Type | Content with respect to mass of aqueous medium (mass %) | Average particle diameter (nm) | Type | Content with respect to mass of aqueous medium (mass %) | Average particle diameter (nm) | mass ratio (inorganic fine particles):(resin particles) | Type | Content ratio when the mass of resin particles is defined as 100 |
| Example 20 | Silica | 0.3 | 5 | PTFE | 1.1 | 250 | 21:79 | Hydrogen peroxide | 5.5 |
| Example 21 | Silica | 1.4 | 5 | PTFE | 0.6 | 250 | 70:30 | Hydrogen peroxide | 8 |

TABLE 6

| Film | Soil dust adhesive property | Carbon black adhesive property | Number of reciprocating motions until detachment | Initial contact angle θ |
|---|---|---|---|---|
| Example 20 | Transparent film | 1 | 2.5 | 52 | 70 |
| Example 21 | Transparent film | 2.5 | 1 | 60 | 38 |

REFERENCE SIGNS LIST

1 hydrophobic particle (resin particle), 2 hydrophilic particle (inorganic particle), 3 hydrophilic grow-p, 4 coating film, 5 member to be coated, 6 decomposition agent (oxidizing agent), 7 air conditioner, 8 fan, 9 heat exchanger, 10 vane, 11 flap, 12 ventilation route-forming member, 13 cover, 14 adhesion reinforcing layer, 15 reaction product, 16 motor, 17 blade body, 18 chassis, 19 gas inlet, 20 gas outlet, 21 ventilation fan, 22 intake opening

The invention claimed is:

1. A coating composition comprising:
    hydrophobic polytetrafluoroethylene (PTFE) particles in an aqueous medium;
    hydrophilic silica fine particles; and
    an oxidizing agent containing hydrogen peroxide;
    wherein the oxidizing is water-soluble and is included in an amount of 0.5 to 10 parts by mass per 100 parts by mass as solid content of the PTFE particles, and
    the silica fine particles have an average particle diameter of 15 nm or less.

2. The coating composition according to claim 1, wherein the oxidizing agent further comprises at least one selected from the group consisting of sodium peroxide, potassium peroxide, magnesium peroxide, calcium peroxide, barium peroxide, ammonium persulfate, potassium persulfate, ammonium perchlorate, sodium persulfate, sodium perchlorate, potassium perchlorate, potassium chlorate, sodium chlorate, ammonium chlorate, calcium superphosphate, potassium superphosphate, sodium periodate, potassium periodate, magnesium periodate, halogen benzoyl peroxide, lauroyl peroxide, acetyl peroxide, dibutyl peroxide, cumene hydroperoxide, butyl hydroperoxide, peroxomonocarbonate, sodium peracetate, potassium peracetate, m-chloroperbenzoic acid, tert-butyl perbenzoate, and percarboxylic acid.

3. The coating composition according to claim 1, wherein the PTFE particles, the silica fine particles and the oxidizing agent are dispersed in the aqueous medium.

4. The coating composition according to claim 1, wherein the PTFE particles having an average particle diameter of 50 nm to 500 nm.

5. The coating composition according to claim 1, wherein:
    the PTFE particles have an average particle diameter of 50 nm to 500 nm; and
    a mass ratio of the silica fine particle to the PTFE particle is from 70:30 to 95:5.

6. A coating method, comprising:
    preparing a first agent having hydrophilic inorganic fine particles and hydrophobic resin particles dispersed in an aqueous medium;
    preparing a second agent by adding, to the first agent, an oxidizing agent containing hydrogen peroxide, wherein the oxidizing agent is water-soluble and is included in an amount of 0.5 to 10 parts by mass per 100 parts by mass as solid content of the PTFE particles, and the silica fine particles have an average particle diameter of 15 nm or less, to obtain the coating composition of claim 1;
    applying the second agent onto a member to be coated; and
    drying the second agent on the member to be coated.

7. A coating method, comprising:
    preparing a coating composition according to claim 1;
    applying the coating composition onto a member to be coated; and
    heating the coating composition on the member to be coated.

8. An air conditioner, comprising:
    an intake opening configured for taking in a gas; a heat exchanger for configured for exchanging heat of a gas taken in from the intake opening; a fan for circulating the gas whose heat is exchanged by the heat exchanger; an air path-forming member configured for forming a path for the gas sent by the fan; a vane and flap configured for introducing the gas sent by the air path-forming member; and a cover configured for including the heat exchanger and the fan inside, wherein:

a surface of at least one selected from the group consisting of the heat exchanger, the fan, the vane, the flap, the air path-forming member, and the cover is supplied, via an adhesion reinforcing layer, with a coating film comprising the coating composition according to claim 1, wherein the PTFE particles having an average particle diameter of 50 nm to 500 nm.

9. A ventilation fan, comprising: a gas inlet; a blade body placed in a path for a gas taken in from the gas inlet; a motor configured for rotating the blade body; a gas outlet configured for discharging the gas by using a gas flow formed by the blade body rotated with the motor; and a chassis configured for including the blade body inside, the chassis being connected to the gas outlet and the gas inlet, wherein:

a surface of at least one selected from the group consisting of the gas inlet, the blade body, the motor, the gas outlet, and the chassis is supplied, with an adhesion reinforcing layer, with a coating film comprising the coating composition of claim 1, wherein the PTFE particles having an average particle diameter of 50 nm to 500 nm.

10. A piece of electrical equipment, comprising;

a coating layer contacted with an adhesion reinforcing layer;

the coating layer comprising the coating composition of claim 1, wherein the PTFE particles having an average particle diameter of 50 nm to 500 nm.

* * * * *